UNITED STATES PATENT OFFICE.

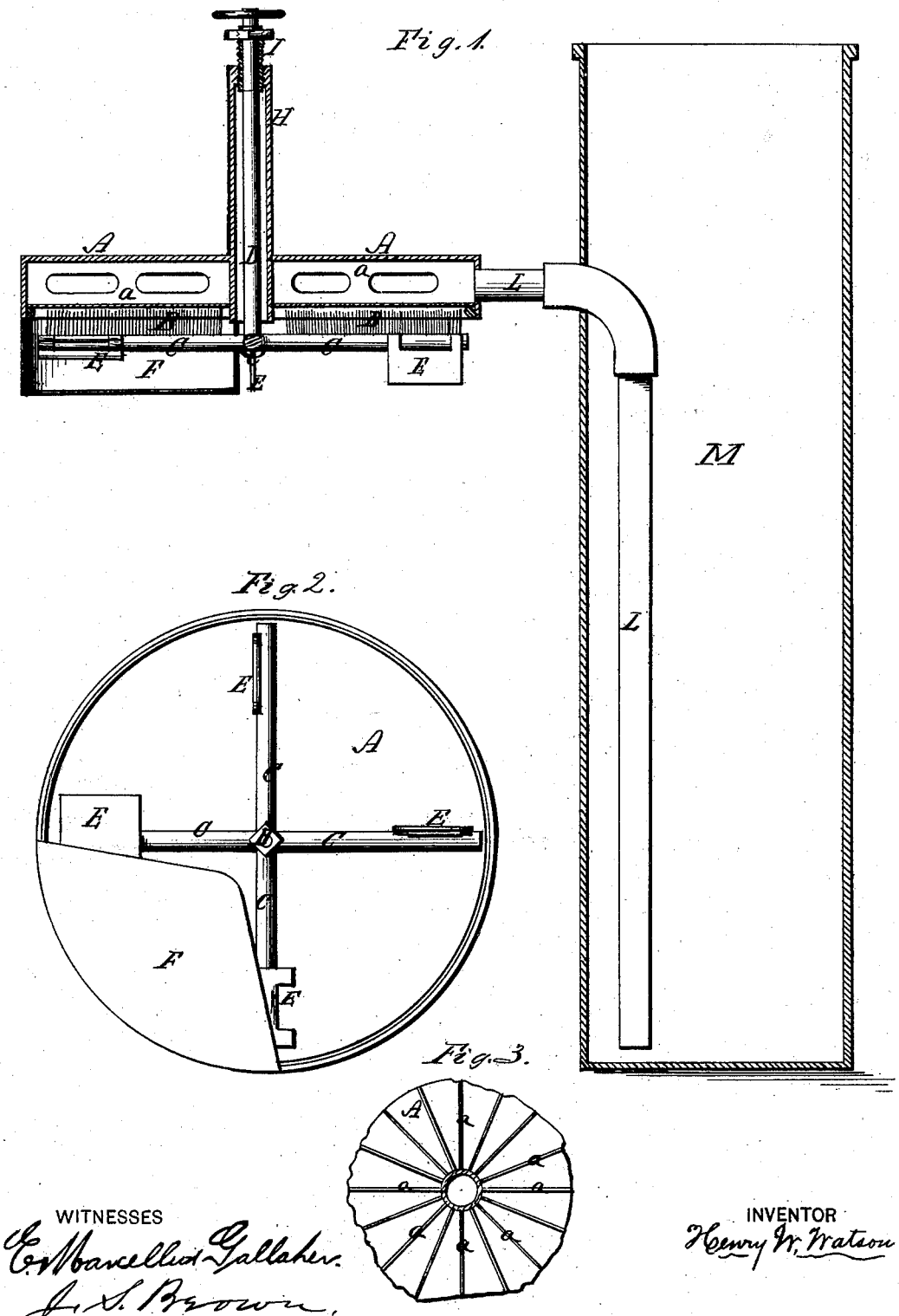

HENRY W. WATSON, OF NEW YORK, N. Y.

IMPROVEMENT IN FILTERS.

Specification forming part of Letters Patent No. 192,103, dated June 19, 1877; application filed February 22, 1877.

*To all whom it may concern:*

Be it known that I, HENRY W. WATSON, of the city, county, and State of New York, have invented an Improved Filter; and I do hereby declare that the following is a full and exact description thereof, reference being had to the accompanying drawings, making part of this specification—

Figure 1 being a central vertical section of the filter; Fig. 2, a view of the under side of the filter proper; Fig. 3, view of part detached.

Like letters designate corresponding parts in all of the figures.

The purpose of my invention is to provide a submerged filter for the filtration, in quantity, of water surrounding the filter; to keep the filter clear by the automatic action of the water in which it is submerged; to regulate the rate of filtration by the quantity of filtered water drawn away, and to effect these purposes by means simple, cheap, and effectual.

The body A of the filter is designed to be sunk to a greater or less depth in the surrounding water, and to be anchored or otherwise supported or suspended therein, and this generally in such a manner that it may be raised to the surface of the water for repairing or any other purpose. It is preferably made shallow in vertical extent, and broad in proportion thereto, in order to secure a large filtering capacity with the least bulk and weight, and it is most conveniently round, as represented. The lower side only may have a filtering-surface, as shown; or both the lower and upper sides may be thus constructed if a larger filtering capacity is required for the size. The material of the filtering wall or diaphragm may be porous porcelain or tiles, or any equivalent substance or substances of a mineral character, or of felt, or equivalent material of a fibrous character. To give strength to the frame and prevent collapse, suitable rib-work *a a* is made inside, as indicated, there being proper openings therein to allow a free circulation of the water to the outlet.

For the perfect and complete action of the filter it is submerged in running or flowing water, not only to more or less effectually wash the surface of the filter by flowing across the same, but for the main purpose of providing means for automatically keeping the surface or surfaces clear from deposit by mechanical action. For this purpose I provide a set of brushes, B B, mounted on radial arms C C, or other suitable frame or carrier, so that all may revolve together on a suitable pivot, D, immediately beneath the lower surface of the filter; and to communicate the revolving movement to these brushes I apply to the respective arms C C vanes or buckets E E, each one hinged to its arm, so as to swing in one direction from a vertical to a horizontal position, but in the other direction not to swing beyond a vertical position. Thus, when mounted below the filter, and the current of water acts on these vanes, those on one side will be held in a vertical position and be acted on by the water, while those on the other side will yield to the current of water and swing nearly into a horizontal position, and thus offer but little resistance to the current of water. The combined effect of these actions is obviously to cause the brushes to revolve at a moderate speed beneath the surface of the filter, and sweep the same by passing nearly or quite in contact therewith. To give greater efficiency to the action of the current on the brush-arms, the returning vanes are preferably shielded from the current by a suitable break-water, F, as shown, or otherwise. This break-water should shield only one-half of the diameter of the filter from the current. Ordinarily they may not pass in actual contact with the filter-surface, but close to it. At intervals, however, it is desirable to bring the brushes into contact with the filter-surface, and to cause them to revolve a short time in that position to thoroughly clear the filter of deposit. To effect this the suspending pivot-rod D extends up through its bearing H above the water, and an adjusting device (represented at I as a screw-collar) serves to adjust the brushes to or away from the filter. The brushes may be made of bristles, india-rubber, or any other suitable material. They can be used in still water by giving a positive movement from above through the pivot or shaft D.

The upper wall or diaphragm of the filter may be of filtering material, though represented in the drawings as impervious. If used to filter, a set of clearing-brushes is used in the same way as those below the filter, the supporting-pivot being tubular, and arranged to surround the suspending-rod D of the lower brushes.

It is to be understood that I do not intend to limit my invention, in respect to the brush-clearing operation, to the mere construction represented and above described. Various other arrangements readily suggest themselves, such as an endless chain of brushes passing under the filter in one direction and back over it in the other direction; or such as the arrangement of the filter in a vertical position, with the brushes revolving at its sides, down-stream in the water, and partially or entirely out of water in the other direction; or the filter, with some constructions, may itself move and the brushes be stationary, particularly if the filter is made of cylindrical form, the journals of which may be tubular, and thereby allow the filtered water to be conveniently drawn off.

From the filter the filtered water runs or is drawn off through a pipe or passage, L, into any suitable cistern or reservoir, M, which may be of any desired capacity. It is arranged in connection with the filter so as to extend as high as the surface of the water in which the filter is submerged, and below the filter deep enough to allow the utmost pressure desired on the surface of the filter by the surrounding water. The drawing-off pipe for this purpose extends nearly to the bottom of the cistern or reservoir, as shown, so that it acts as a draft-tube to the filter; therefore, since the amount of water passing through the filter depends greatly on the inward pressure of the surrounding water, the variation of the height of water in the cistern or reservoir, by increasing and diminishing the drawing force of the drawing-off pipe, regulates the amount of water by the demand on the filtered water, since the lower the water gets in the cistern by an increased demand the greater the pressure on the filter and the quantity of water passed through it; and, on the other hand, as the water rises in the cistern or reservoir, consequent on a diminished demand, the pressure of water on the filter diminishes, and the less water is filtered through it, even up to the filling of the cistern, when the filtering action necessarily ceases.

If the reservoir is large, so as to render it inconvenient to make one filter of sufficient capacity to supply it, the number of filters may be increased to any extent necessary, the same construction as above described being given to each.

What I claim as my invention, and desire to secure by Letters Patent, is—

1. In combination with a filter submerged in running water, revolving or removable brushes B B, operated by the water in which they are submerged, substantially as and for the purpose herein specified.

2. In combination with a submerged filter, a cistern or reservoir, M, extending below the same, and a drawing-off pipe, L, extending from the filter nearly to the bottom of the said cistern or reservoir, substantially as and for the purpose herein specified.

3. In combination with a filter submerged in running water, and clearing-brushes operated by the motion of the water, a break-water, F, arranged and operating substantially as and for the purpose herein specified.

HENRY W. WATSON.

Witnesses:
  JOS. BROWN,
  JOHN T. ARMS.